Sept. 1, 1959 D. E. MOELLER 2,902,548
SIGNAL LEVEL CONTROL CIRCUIT
Filed Sept. 9, 1955
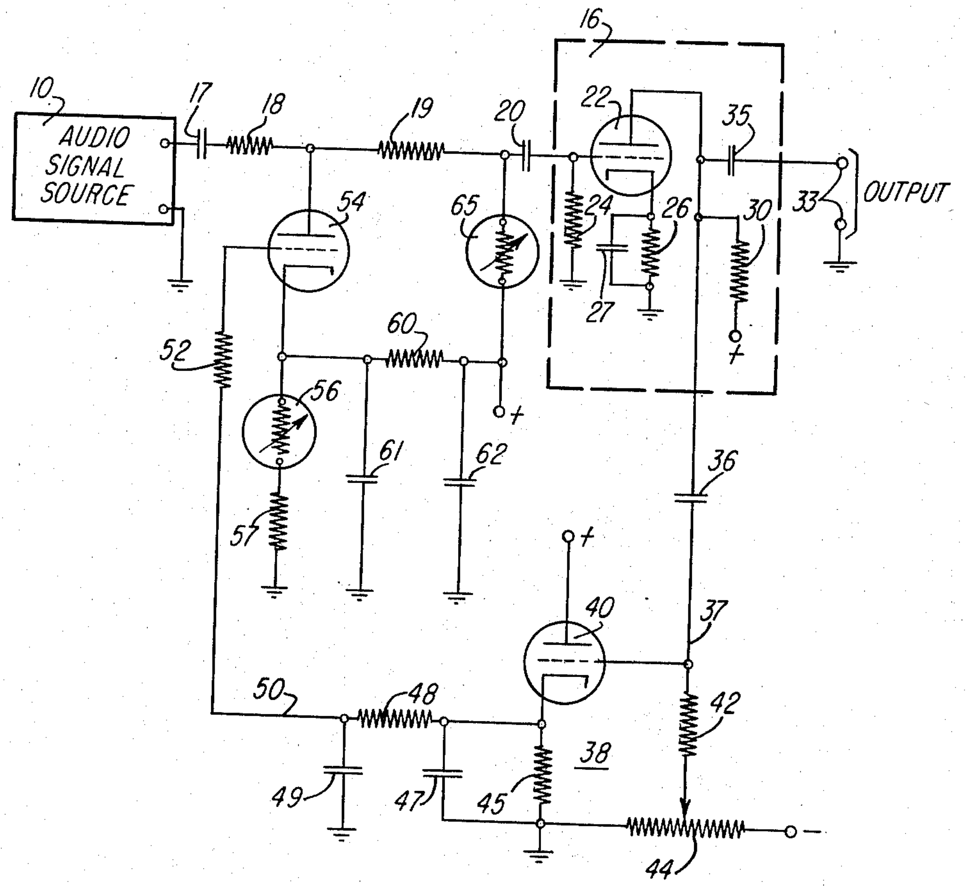
INVENTOR.
Douglas E. Moeller
BY
Mueller & Aichele
Attys.

2,902,548

SIGNAL LEVEL CONTROL CIRCUIT

Douglas E. Moeller, Elgin, Ill., assignor to Motorola, Inc., Chicago, Ill., a corporation of Illinois Application September 9, 1955, Serial No. 533,479

7 Claims. (Cl. 179—171)

This invention relates to electronic control circuits and more particularly to gain control circuits of the type which provide relatively constant output as the signal input thereto is subject to comparatively wide fluctuation.

There are various situations in which it is desirable to provide automatic control of signal levels. For example, in an audio frequency amplifier a system of automatic volume control may be used in order to maintain a constant output level as the signal input varies over a certain range. However, many of the past gain control circuits have been of a type to permit only a limited fluctuation in the signal to be regulated before the output is no longer constant, that is, the system does not have the ability to handle effectively large signal ranges. Furthermore, a common difficulty with such gain control systems has been the introduction of distortion of the translated signal, particularly in systems designed to operate over sizeable signal ranges.

Accordingly, it is an object of this invention to provide a control circuit, which maintains a relatively constant output over a wide range of input signal levels.

Another object is to provide a simple signal control circuit which automatically furnishes a relatively constant output over wide signal input ranges and which circuit introduces but a minimum of distortion into the translated signal.

A feature of the invention is the provision of a translating circuit including a first variable signal shunting path for translated signals including a vacuum tube and separate signal controlled bias means to increase the conductivity of the tube and thus shunt a portion of the signal when the level thereof rises, and a second signal shunting path including a thermistor in the anode circuit of the vacuum tube which furnishes increased shunting of the translated signal as the anode current of the tube rises in response to change in the bias thereof.

Another feature of the invention is the provision of such a dual attenuation network in which the vacuum tube cathode is coupled to a voltage stabilizing network including a thermistor adapted to exhibit lower resistance as the anode current of the tube rises, thus preventing degeneration in the first signal shunting path which comprises the vacuum tube anode resistance.

Further objects, features and the attending advantages thereof will be apparent upon consideration of the following description when taken in conjunction with the drawing in which the single figure is a schematic diagram showing the connection of the signal control circuit.

In summary, this invention provides an automatic gain control circuit which is particularly adapted for control of volume in audio signal translating circuits. A bias developing circuit is coupled to a point in the audio system of comparatively high signal level so that when the signal at this point rises above a given level, a bias proportional to the signal is available. Such a bias is applied to regulate the conduction of a vacuum tube connected so that the plate resistance thereof serves as a first shunting path for a translated signal. The cathode of the vacuum tube may be connected to a voltage dividing network including a thermistor to maintain the cathode potential constant as the anode current rises to decrease the plate resistance and shunt portions of a signal. A second signal shunting path comprises a thermistor in the direct current anode voltage supply for the tube so that increased anode current, resulting from biasing of the tube, lowers the resistance of this thermistor to further attenuate or shunt the translated signal.

Referring now to the drawing, which shows a specific embodiment of the invention, a detailed description of the operation thereof will be given. An audio signal source 10 is shown coupled to a relatively high gain audio amplifier 16, being applied through blocking capacitor 17, series resistors 18 and 19 and blocking capacitor 20 to the control grid of amplifier valve 22. Resistor 24 provides a D.C. path to ground for the control grid of valve 22, and the parallel combination of resistor 26 and capacitor 27 between the cathode of valve 22 and ground furnish cathode bias. The anode of valve 22 is coupled through load developing resistor 30 to a positive potential source, and the signal from amplifier 16 is coupled to output terminals 33 by means of capacitor 35 connected to the anode.

Also connected to the anode of valve 22 is the bias developing circuit 38. The signal from the valve 22 is coupled to the control grid of valve 40 by means of capacitor 36, and lead 37 and the anode of this valve is connected directly to the positive potential source. Resistor 42 is connected from the control grid of valve 40 to the variable arm of resistor 44, one side of which is connected to a source of negative potential and the other side of which is connected to ground. Thus, by adjustment of resistor 44, a selected fixed bias may be placed on the control grid of valve 40. Resistor 45, connected between the cathode of valve 40 and ground, serves as a load developing resistor and capacitor 47 connected across resistor 45, filters any fluctuation in the output from the bias developing circuit 38. Resistor 48 is connected to the load resistor 45 and capacitor 49 is connected from resistor 48 to ground to complete a pi type filter system for the output from the bias developing circuit 38.

The output of the circuit 38 is applied through lead 50 and through resistor 52 to the control grid of valve 54. The anode of valve 54 is coupled to the junction of resistors 18 and 19, while the cathode of this valve is coupled through thermistor 56 and resistor 57 to ground. Resistor 60 is also coupled from the cathode of valve 54 to the positive potential source and capacitors 61 and 62 are coupled from respective ends of resistor 60 to ground. Capacitors 61 and 62 have a low impedance with respect to the audio signal to be translated in the system. Thermistor 65 is coupled from the junction of resistor 19 and capacitor 20 to the positive potential source and this thermistor has the property of decreasing in resistance as the current therethrough tends to rise.

Having thus described the connection of the circuit, the operation thereof will now be explained. Audio signals supplied by the signal source 10 are applied to the amplifier 16 which impresses the signal across the output terminals 33. However, when the audio signals being translated rise above the bias level of the control grid of valve 40 which is set at or below cut off of valve 40, this valve will conduct and increase the charge on capacitors 47 and 49. These capacitors may be comparatively large so that any increases in the signal level at lead 37 which are of short duration will not appear as an increased output at lead 50. Therefore, only when the average level of the audio signal tends to rise above the bias level of tube 40 will an increased positive potential appear at lead 50 due to the conduction of valve 40.

Accordingly, when the signals being translated rise above the level determined by the setting of resistor 44, the bias developing circuit 38 applies a positive potential to the control grid of valve 54. In the normal non-conducting state of valve 40, that is, when no bias is supplied by way of lead 50 to the valve 54, the bias on valve 54 is at a fixed value due to the voltage divider action of thermistor 56, resistors 57 and 60. Thus, there will be a small anode current flowing through resistor 19 and thermistor 65. However, as the conduction of valve 54 is increased due to the application of a bias thereto over line 50, the plate resistance of valve 54 will decrease, causing an increase in the anode current thereof. An increase in the anode current of valve 54 increases the current flowing through thermistor 65 and causes the resistance of this device to decrease. Thus, it may be seen that a first signal attenuating current is provided through the signal shunting path provided by the anode circuit of valve 54 and the low impedance path to ground through capacitor 61. Furthermore, a second signal attenuating path is provided through thermistor 65 and the low impedance path of capacitor 62 to ground.

Merely by way of example, the following circuit values of an operative embodiment of the invention are given:

| | |
|---|---|
| Resistor **18** | 150,000 ohms. |
| Resistor **19** | 56,000 ohms. |
| Valve **54** | ½12AX7. |
| Thermistor **56** | 35C1. |
| Resistor **57** | 39 ohms. |
| Resistor **60** | 68,000 ohms. |
| Thermistor **65** | 65A1. |
| Potential applied to thermistor **65** | 150 volts. |

Capacitors 17, 20, 36, 61, 62 may have a low reactance at the audio frequencies to be translated by the system.

It should also be pointed out that the cathode potential of the valve 54 in the first signal shunting circuit is maintained at a constant value through the operation of thermistor 56 even when the anode current through valve 54 is changed during its performance of the signal shunting function. When the current through valve 54 increases, the resistance of thermistor 56 decreases, thus tending to maintain a constant cathode bias on valve 54. There is, accordingly, a reduced tendency for the cathode of valve 54 to follow the bias signal supplied by lead 50 which would tend to cause degeneration or reduce the effect of the D.C. control bias from bias developing circuit 38.

From the above description it may be seen that the gain control system will come into operation when the average level of the signal output from amplifier 16 exceeds a level determined by the setting of variable resistor 44 at which point the dual signal shunting network may maintain the signal input to amplifier 16 at a relatively constant level. In a practical embodiment of the invention, it has been found that an input variation of 42 db results in an output variation of less than 7 db. With an input variation having less extreme fluctuations, the output can be held even more constant.

The described circuit thus provides a highly satisfactory gain control system which is of comparatively simple construction. The signal level control supplied from bias developing circuit 38 is a direct current voltage so that it may easily be supplied from a remote location. Furthermore, the dual nature of the signal shunting paths as described above, provides a system which operates satisfactorily over a very wide range of signal levels. In addition, there is but a minimum amount of distortion introduced into the translated signal and harmonic distortion in particular is at a low level in the described circuit.

I claim:

1. A signal control system including in combination first and second signal conducting means comprising a signal translating circuit, a first signal shunting path connected across said signal translating circuit including an electron discharge device having current carrying electrodes in said first signal shunting path and further having a control element for controlling current flow therethrough and for thereby controlling the resistance of said discharge device in response to a signal applied to said control element, a second signal shunting path connected across said signal translating circuit including a thermistor having a resistance subject to decrease in response to an increase of current therethrough, said first and second signal shunting paths being intercoupled through said first signal conducting means so the current flowing through said discharge device also passes through said thermistor to decrease the resistance thereof as the current increases in said discharge device, and means for supplying to said control element of said electron discharge device a signal proportional to the level of a signal translated by the system to lower the internal resistance of said discharge device and to decrease the resistance of said first and second signal shunting paths.

2. A signal control system including in combination first and second signal conducting means comprising a signal translating circuit, a first signal shunting path connected across said signal translating circuit including an electron discharge device with an emission element and a current carrying electrode in said first signal shunting path, said electron discharge device further having a control element for controlling current conductivity of the device and for thereby controlling the resistance of said device in response to a bias applied to said control element, a second signal shunting path connected across said signal translating circuit including a first thermistor having a resistance subject to decrease in response to an increase of current therethrough, means for supplying a bias to said control element of said electron discharge device which is proportional to the level of a signal translated by the system to lower the internal resistance of said discharge device and to decrease the resistance of said first signal shunting path, said system including means for applying the current flowing through said discharge device to said first thermistor to control the current therethrough and thereby control the resistance of said second signal shunting path, and voltage divider means including a second thermistor coupled in the current path of said emission element, said second thermistor having a resistance adapted to decrease as the current through said emission element increases to maintain a substantially constant potential on said emission element and prevent degeneration by said bias.

3. A control system including in combination a circuit for translating audio frequency signals having a given impedance between input and output means thereof, a first signal shunting path connected across said input means of said signal translating circuit including an electron discharge device having current carrying electrodes coupled in said first signal shunting path, said electron discharge device having a control element and an internal resistance subject to variation in response to a bias applied to said control element, a second signal shunting path across said output means including a thermistor having a resistance subject to decrease in response to an increase of current therethrough, means to supply a direct current operating potential across said current carrying electrodes of said electron discharge device and at least a portion of said signal translating circuit and said thermistor all in series, circuit means for supplying to said control element of said electron discharge device a bias proportional to the level of a translated signal to lower the internal resistance of said discharge device and to decrease the resistance of said thermistor as current increases through said electron discharge device for shunting portions of a translated signal through said first and second signal shunting paths.

4. A variable control circuit for regulating the conduction of an audio frequency signal translated thereby including in combination, a signal translation path having first and second resistors series coupled between input and output means thereof and in which a translated signal appears at given levels at said input and output means with respect to ground, means coupled to said output means for developing a positive direct current bias potential proportional to the average level of a signal above a selected level translated by said path, an electron discharge device having current carrying electrodes coupled between the common connection of said first and second resistors and ground, said discharge device having a control element coupled to said means for developing a bias potential for increasing the conduction thereof in response to the bias potential, a potential source having low impedance to ground at frequencies of translated signals, and a thermistor having a resistance which decreases with increased current therethrough coupled between said output means and said potential source to supply an operating potential to said electron discharge device through said second resistor, whereby the rise of a translated signal above the selected level causes reduction of the resistance of said electron discharge device as the bias is applied thereto and causes a decrease in the resistance of said thermistor as the current is increased therethrough to shunt portions of the translated signal to ground through said discharge device and said thermistor.

5. A variable control circuit for regulating the conduction of an audio frequency signal translated thereby including in combination, a signal translation path having a predetermined impedance between input and output means thereof and in which a translated signal appears at given levels at said input and output means with respect to ground, means coupled to said output means for developing a positive direct current bias potential proportional to the average level of a signal above a selected level translated by said path, an electron discharge device having an anode coupled to said input means and further having an emission element and a control element, said control element being coupled to said means for developing a bias potential for increasing the conduction of said electron discharge device in response to the bias potential, a direct current potential source positive with respect to ground and having low impedance to ground at frequencies of translated signals, a voltage divider including resistor means coupled to said potential source and a first thermistor having a resistance which decreases with increased current flow therethrough, said first thermistor being coupled between ground and said emission element to maintain a substantially constant potential at said emission element, and a second thermistor having a resistance which decreases with increased current therethrough coupled between said output means and said potential source to supply an operating potential through a portion of said signal translation path to said electron discharge device, whereby the rise of a translated signal above the selected level causes reduction of the resistance of said electron discharge device as the bias is applied thereto and causes a decrease in the resistance of said second thermistor as the current is increased therethrough to shunt portions of the translated signal to ground through said discharge device and said second thermistor.

6. A signal level control system including in combination a signal translating circuit having given direct-current-conducting impedance coupled between input and output means therefor, a source of audio frequency signals coupled to said input means, signal amplifying means having an output circuit and further having an input circuit coupled to said output means, a first signal shunting path across said input means including a first electron discharge device having a control element and an internal resistance subject to variation in response to a bias applied to said control element, a second signal shunting path across said output means including a thermistor having a resistance subject to decrease in response to an increase of current therethrough, means to supply an operating potential across said first electron discharge device and said impedance of said signal translating circuit and said thermistor all in a series circuit, a bias circuit coupled to said output circuit of said amplifying means and including a second electron discharge device in a normally nonconducting condition, said second discharge device being adapted to conduct when a signal at said output circuit reaches a selected level, said bias circuit further having a filter network coupled to said second discharge device and adapted to provide a positive potential related to the average of a signal above said selected level at said output circuit and means to apply said positive potential to said control element of said first discharge device to lower the internal resistance thereof and to decrease the resistance of said thermistor as current increases through said series circuit for shunting portions of a translated signal through said first and second signal shunting paths.

7. A signal level control system including in combination first and second series coupled resistor means adapted to translate a signal of amplitude subject to vary with respect to a reference point, an electron discharge device having an anode, a cathode and a control grid, means connecting said anode to the junction of said first and second resistor means, a control circuit connected to said control grid and providing a potential variable directly with the level of the signal translated by said first and second resistor means to cause increased conduction of said electron discharge device and reduction of the internal resistance thereof upon increase of the level of the signal translated, a first thermistor connecting said cathode to the reference point, a resistor connecting said cathode to a potential source whereby said first thermistor and said resistor form a voltage divider to reduce the tendency for degeneration in said electron discharge device by the control potential, and a second thermistor connected between said second resistor means and a potential source for said electron discharge device whereby said electron discharge device conducts through said second thermistor to provide shunting of the translated signal through both said electron discharge device and said second thermistor.

References Cited in the file of this patent

UNITED STATES PATENTS

| | | |
|---|---|---|
| 2,018,489 | Doba | Oct. 22, 1935 |
| 2,021,920 | Norwine | Nov. 26, 1935 |
| 2,182,329 | Wheeler | Dec. 5, 1939 |
| 2,208,665 | Crabtree | July 23, 1940 |
| 2,212,337 | Brewer | Aug. 20, 1940 |
| 2,342,238 | Barney | Feb. 22, 1944 |
| 2,734,172 | Appert | Feb. 7, 1956 |